US011084270B2

(12) United States Patent
Moon

(10) Patent No.: US 11,084,270 B2
(45) Date of Patent: *Aug. 10, 2021

(54) METHOD OF MANUFACTURING A FLEXIBLE DISPLAY SUBSTRATE AND PROCESS FILM FOR MANUFACTURING A FLEXIBLE DISPLAY SUBSTRATE

(71) Applicant: SAMSUNG DISPLAY CO., LTD., Yongin-si (KR)

(72) Inventor: Soo-jin Moon, Seoul (KR)

(73) Assignee: Samsung Display Co., Ltd., Yongin-si (KR)

(*) Notice: Subject to any disclaimer, the term of this patent is extended or adjusted under 35 U.S.C. 154(b) by 211 days.

This patent is subject to a terminal disclaimer.

(21) Appl. No.: 16/299,840

(22) Filed: Mar. 12, 2019

(65) Prior Publication Data

US 2019/0212590 A1 Jul. 11, 2019

Related U.S. Application Data

(63) Continuation of application No. 13/984,823, filed as application No. PCT/KR2013/002780 on Apr. 3, 2013, now Pat. No. 10,268,058.

(30) Foreign Application Priority Data

Apr. 5, 2012 (KR) ........................ 10-2012-0035708

(51) Int. Cl.
*B32B 37/18* (2006.01)
*G02F 1/1333* (2006.01)
(Continued)

(52) U.S. Cl.
CPC .............. *B32B 37/18* (2013.01); *B32B 38/10* (2013.01); *G02F 1/1333* (2013.01); *B32B 37/02* (2013.01);
(Continued)

(58) Field of Classification Search
None
See application file for complete search history.

(56) References Cited

U.S. PATENT DOCUMENTS 7,906,784 B2   3/2011   Koyama et al.
8,449,710 B2   5/2013   Furuya et al.
(Continued)

FOREIGN PATENT DOCUMENTS

CN   102540513 A   7/2012
JP   6-281920      10/1994
(Continued)

OTHER PUBLICATIONS

JPO Office Action dated Feb. 7, 2017, for corresponding Japanese Patent Application No. 2015-504495 (5 pages).
(Continued)

*Primary Examiner* — Christopher T Schatz
(74) *Attorney, Agent, or Firm* — Lewis Roca Rothgerber Christie LLP

(57) ABSTRACT

A method of manufacturing a flexible display substrate using a process film and a process film for manufacturing a flexible display substrate are provided. The method of manufacturing the flexible display substrate using the process film is as follows. A base layer for the flexible display substrate is prepared on a glass substrate. A packaging process is performed on the base layer to form a plurality of cells which are spaced apart from one another at a predetermined distance. The base layer is covered with the process film, after forming the plurality of cells. The base layer is separated from the glass substrate, while the base layer is laminated to the process film. The base layer is cut along each cell to form a plurality of flexible display substrates. Accordingly, the method of manufacturing the flexible display substrate using the process film is provided to improve the convenience of a manufacturing process and the reli- (Continued)

ability of the manufactured flexible display substrate by manufacturing the plurality of display substrates using the process film.

19 Claims, 7 Drawing Sheets

(51) Int. Cl.
*B32B 37/12* (2006.01)
*B32B 38/00* (2006.01)
*B32B 37/02* (2006.01)
*B32B 38/10* (2006.01)

(52) U.S. Cl.
CPC ........... *B32B 37/12* (2013.01); *B32B 38/0004* (2013.01); *B32B 2307/21* (2013.01); *B32B 2309/105* (2013.01); *B32B 2457/20* (2013.01); *Y10T 428/24942* (2015.01); *Y10T 428/26* (2015.01); *Y10T 428/266* (2015.01); *Y10T 428/28* (2015.01); *Y10T 428/2848* (2015.01)

(56) References Cited

U.S. PATENT DOCUMENTS

| | | | |
|---|---|---|---|
| 8,963,171 | B2 | 2/2015 | Kuranaga et al. |
| 9,941,115 | B2 | 4/2018 | Tamura et al. |
| 10,268,058 | B2 * | 4/2019 | Moon .................. G02F 1/1333 |
| 2003/0222334 | A1 | 12/2003 | Ikeda et al. |
| 2004/0171194 | A1 | 9/2004 | Lee |
| 2008/0192197 | A1 | 8/2008 | Takahashi |
| 2010/0099240 | A1 | 4/2010 | Watanabe et al. |
| 2010/0279576 | A1 | 11/2010 | Kim |
| 2011/0260180 | A1 | 10/2011 | Kuranaga et al. |
| 2012/0040180 | A1 | 2/2012 | Husemann et al. |
| 2012/0164909 | A1 | 6/2012 | Ohashi et al. |

FOREIGN PATENT DOCUMENTS

| | | |
|---|---|---|
| JP | 2000-85068 A | 3/2000 |
| JP | 2001-30427 A | 2/2001 |
| JP | 2003-345267 A | 12/2003 |
| JP | 2006-066906 A | 3/2006 |
| JP | 2006-237542 A | 9/2006 |
| JP | 2006-270077 A | 10/2006 |
| JP | 2008-246938 | 10/2008 |
| JP | 2009-230147 A | 10/2009 |
| JP | 2010-224426 A | 10/2010 |
| JP | 2011-44262 A | 3/2011 |
| JP | 2011-61215 | 3/2011 |
| JP | 2011-227369 A | 11/2011 |
| JP | 2012-51777 | 3/2012 |
| KR | 10-2008-0091964 A | 10/2008 |
| KR | 10-2010-0033014 | 3/2010 |
| WO | WO 2008/010547 A1 | 1/2008 |

OTHER PUBLICATIONS

Dictionary.com definition of "On". Retrieved via online search Feb. 9, 2017, www.dictionary.com, 1 sheet.

Machine translation of Tamakoshi et al., JP Publication No. 2008-246938.

Abstract of Japanese Patent Application No. 2009-074083 Corresponding to Japanese Patent Publication JP 2010-224426 A, 1 Page.

\* cited by examiner

METHOD OF MANUFACTURING A FLEXIBLE DISPLAY SUBSTRATE AND PROCESS FILM FOR MANUFACTURING A FLEXIBLE DISPLAY SUBSTRATE

CROSS-REFERENCE TO RELATED APPLICATION(S)

This application is a continuation of U.S. application Ser. No. 13/984,823 filed Aug. 9, 2013 which is a National Phase Patent Application and claims priority to International Application Number PCT/KR2013/002780, filed on Apr. 3, 2013, which in turn claims priority to Korean Patent Application No. 10-2012-0035708, filed on Apr. 5, 2012 in the Korean Intellectual Property Office (KIPO), the content of both of which are incorporated herein by reference in their entirety.

BACKGROUND

1. Field

Example embodiments relate generally to a method of manufacturing a flexible display substrate using a process film and a process film for manufacturing a flexible display substrate. More particularly, embodiments of the invention relate to a method of manufacturing a flexible display substrate directed to providing an improved convenience of a manufacturing process and a reliability of the manufactured flexible display substrate, and a process film for manufacturing the same.

2. Description of the Related Art

In a current information society, there is a great emphasis on display devices as visual information transmission media, and display devices having low power consumption, reduced size, reduced weight, high resolution, and the like are desired.

In particular, a flat panel display (FPD) device having the reduced size and the reduced weight replaces a conventional cathode-ray tube (CRT) device, and the flat panel display is divided into a liquid crystal display (LCD) device, a plasma display panel (PDP) device, an organic electroluminescent display (OLED) device, and the like.

In the conventional method of manufacturing the FPD device, a glass substrate having a high thermal resistance and a high transmittance is used, because the manufacturing process of the FPD device is performed at a relatively high temperature. However, the glass substrate has a poor impact resistance and a relatively large weight, and it is hard to increase the size of the glass substrate.

Recently, a resin having a desired impact resistance, a reduced weight and a desired optical characteristic, for example a thermoplastic resin such as polycarbonate (PC), polyimide (PI), polyethersulfone (PES), polyarylate (PAR), poly(ethylene naphthalate) (PEN), poly(ethylene terephthalate) (PET) and cycloolefin copolymer or a thermosetting resin such as an acryl resin, an epoxy resin and an unsaturated polyester resin is used to form a flexible display substrate.

The flexible display substrate may include a plastic layer or a metal foil having a thickness thinner than that of the glass substrate, so that the flexible display substrate may be thin, flexible and inexpensive. Therefore, the flexible display substrate has been widely studied recently.

FIG. 1 is a schematic diagram illustrating a conventional method of manufacturing a flexible display substrate.

Referring to FIG. 1, in the conventional method of manufacturing a flexible display substrate, an adhesive 20 is coated on a glass 10, and a base layer 30 of the flexible display substrate is bonded on the adhesive 20 to fix the base layer 30 on the glass 10. Alternatively, the base layer 30 may be fixed on the glass 10 using other methods instead of the adhesive 20.

Then, a cleaning process, a thin film deposition process, a photoresist process, an etching process, and the like are performed to form various signal lines and an array of thin film transistors on the base layer 30, thereby forming a display portion 40 and a terminal portion 50 disposed adjacent to the display portion 40. The packaged base layer 30 is cut to complete the flexible display substrate.

However, the flexible display substrates are manufactured one by one in the conventional method, and thus the unit cost of production is expensive.

Further, during the step of cutting the base layer 30, the display portion 40 and the terminal portion 50 may be scratched, and static electricity or fine dust may become a problem.

Therefore, a method of manufacturing a flexible display substrate is desired to provide an improved convenience of a manufacturing process and reliability of the manufactured flexible display substrate.

PRIOR ART DOCUMENT

Korean Patent Applications No. 10-2008-0091964

SUMMARY

Example embodiments provide a method of manufacturing a plurality of flexible display substrates directed to providing an improved convenience of a manufacturing process and a reliability of manufactured flexible display substrates, and a process film for manufacturing the same.

According to some example embodiments, there is provided a method of manufacturing a flexible display substrate using a process film. In the method, a base layer for the flexible display substrate is prepared on a glass substrate. A packaging process is performed on the base layer to form a plurality of cells. The cells are spaced apart from one another at a predetermined distance. The base layer is covered with the process film, after forming the plurality of cells. The base layer is separated from the glass substrate, while the base layer is laminated to the process film. The base layer is cut along each cell to form a plurality of flexible display substrates, while the base layer is laminated to the process film.

In example embodiments, the method of manufacturing the flexible display substrate using the process film may further comprise opening a terminal portion of the flexible display substrate such that a flexible printed circuit can be bonded to the flexible display substrate, after forming the plurality of flexible display substrates.

In example embodiments, opening the terminal portion of the flexible display substrate may include cutting the process film to a lower portion of the process film adjacent to a top surface of the flexible display substrate, such that a circuit disposed in the terminal portion may be protected.

In example embodiments, opening the terminal portion of the flexible display substrate may further include tearing off a portion of the process film from the flexible display substrate using an adhesion tape, after cutting the process film.

In example embodiments, the method of manufacturing the flexible display substrate using the process film may further comprise forming a back film on a rear surface of the base layer to protect the base layer, after separating the base layer from the glass substrate.

According to some example embodiments, there is provided a method of manufacturing a flexible display substrate using a process film. In the method, a base layer for the flexible display substrate is prepared on a glass substrate. A packaging process is performed on the base layer to form a cell. The base layer is covered with the process film, after forming the cell. The base layer is separated from the glass substrate, while the base layer is laminated to the process film. The base layer is cut along the cell to form the flexible display substrate, while the base layer is laminated to the process film.

According to some example embodiments, there is provided a process film for manufacturing a flexible display substrate. The process film includes a first base film and a first adhesion layer. The first base film provides a predetermined strength and a predetermined flatness to a base layer during a manufacturing process of the flexible display substrate. The first adhesion layer is disposed under the first base film, such that the first base film is laminated on a base layer of the flexible display substrate.

In example embodiments, the first adhesion layer may include 0.2 to 10 parts by weight of a Pt-catalyst with respect to 100 parts by weight of an organopolysiloxane mixture. The first adhesion layer may have relatively small bonding strength about the base layer of the flexible display substrate.

In example embodiments, the first adhesion layer may further include 0.1 to 1.0 parts by weight of a crosslinker to prevent or reduce an occurrence of a fine dust.

In example embodiments, the first adhesion layer may further include 0.1 to 1.0 parts by weight of an anchorage additive to improve the bonding strength of the process film about the base layer.

In example embodiments, the first base film may have a thickness of 25 μm to 210 μm, and the first adhesion layer may have a thickness of 20 μm to 150 μm.

In example embodiments, the process film for manufacturing the flexible display substrate may further include a first anti-static coating layer on the first base film for preventing static electricity.

In example embodiments, the process film for manufacturing the flexible display substrate may further include a protection film laminated on the first base film to protect the first base film. The protection film may provide a predetermined strength and a predetermined flatness to the first base film.

In example embodiments, the protection film may include a second base film and a second adhesion layer under the second base film. The second adhesion layer may bond the second adhesion layer on the second base film.

In example embodiments, a bonding strength of the second adhesion layer may be smaller than a bonding strength of the first adhesion layer.

In example embodiments, the protection film may further include a second anti-static coating layer on the second base film for preventing static electricity and a third anti-static coating layer under the second base film for preventing static electricity.

In example embodiments, the process film for manufacturing the flexible display substrate may further include an adhesive protection film under the first adhesion layer. The adhesive protection film may prevent a contamination of the first adhesion layer until the first base film is laminated on the base layer.

In example embodiments, the adhesive protection film may include a third base film, a fourth anti-static coating layer on the third base film for preventing static electricity and a fifth anti-static coating layer under the third base film for preventing static electricity.

Accordingly, a method of manufacturing a flexible display substrate using a process film is provided to improve the convenience of a process and the reliability of the manufactured flexible display substrate by manufacturing the plurality of display substrates using the process film.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Figure 1:
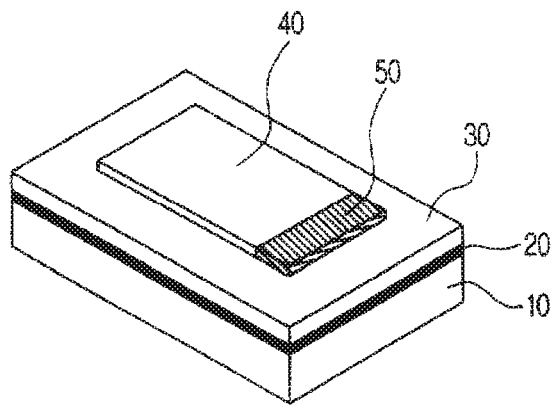
FIG. 1 is a schematic diagram illustrating a conventional method of manufacturing a flexible display substrate.

Various example embodiments will be described more fully hereinafter with reference to the accompanying drawings, in which some example embodiments are shown. The present invention may, however, be embodied in many different forms and should not be construed as limited to the example embodiments set forth herein. Rather, these example embodiments are provided so that this disclosure will be thorough and complete, and will more fully convey the scope of embodiments of the present invention to those skilled in the art. In the drawings, the sizes and relative sizes of layers and regions may be exaggerated for clarity. Like numerals refer to like elements throughout.

Figure 2:
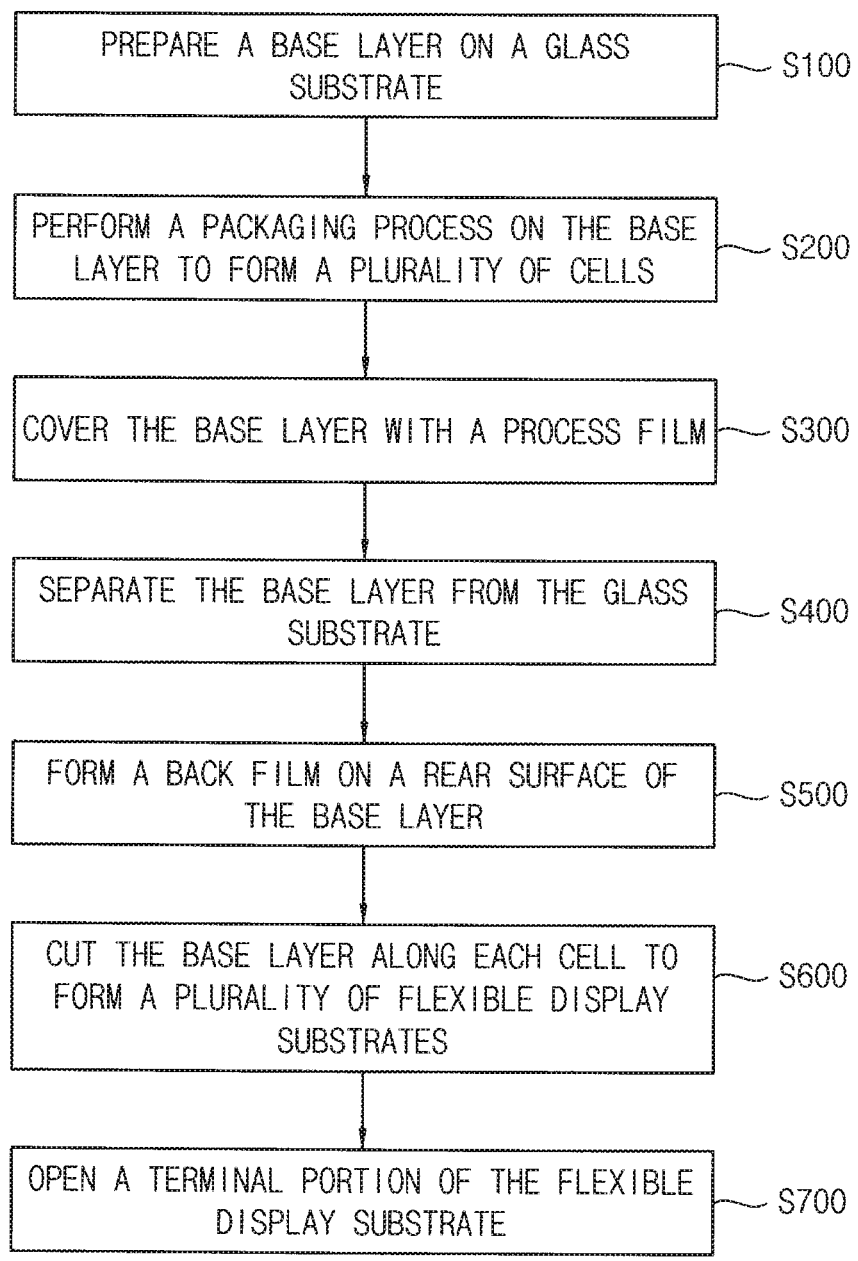
FIG. 2 is a block diagram illustrating a method of manufacturing a flexible display substrate using a process film according to an example embodiment.
Figure 3:
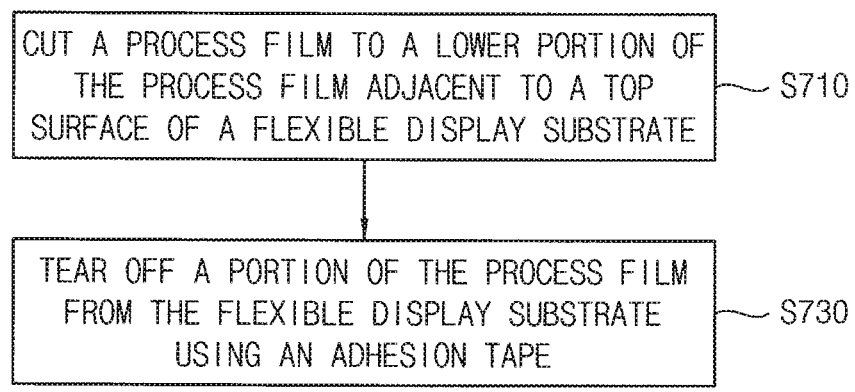
FIG. 3 is a block diagram illustrating a step of opening a terminal portion in the method of manufacturing the flexible display substrate using the process film of FIG. 2.
Figure 4:
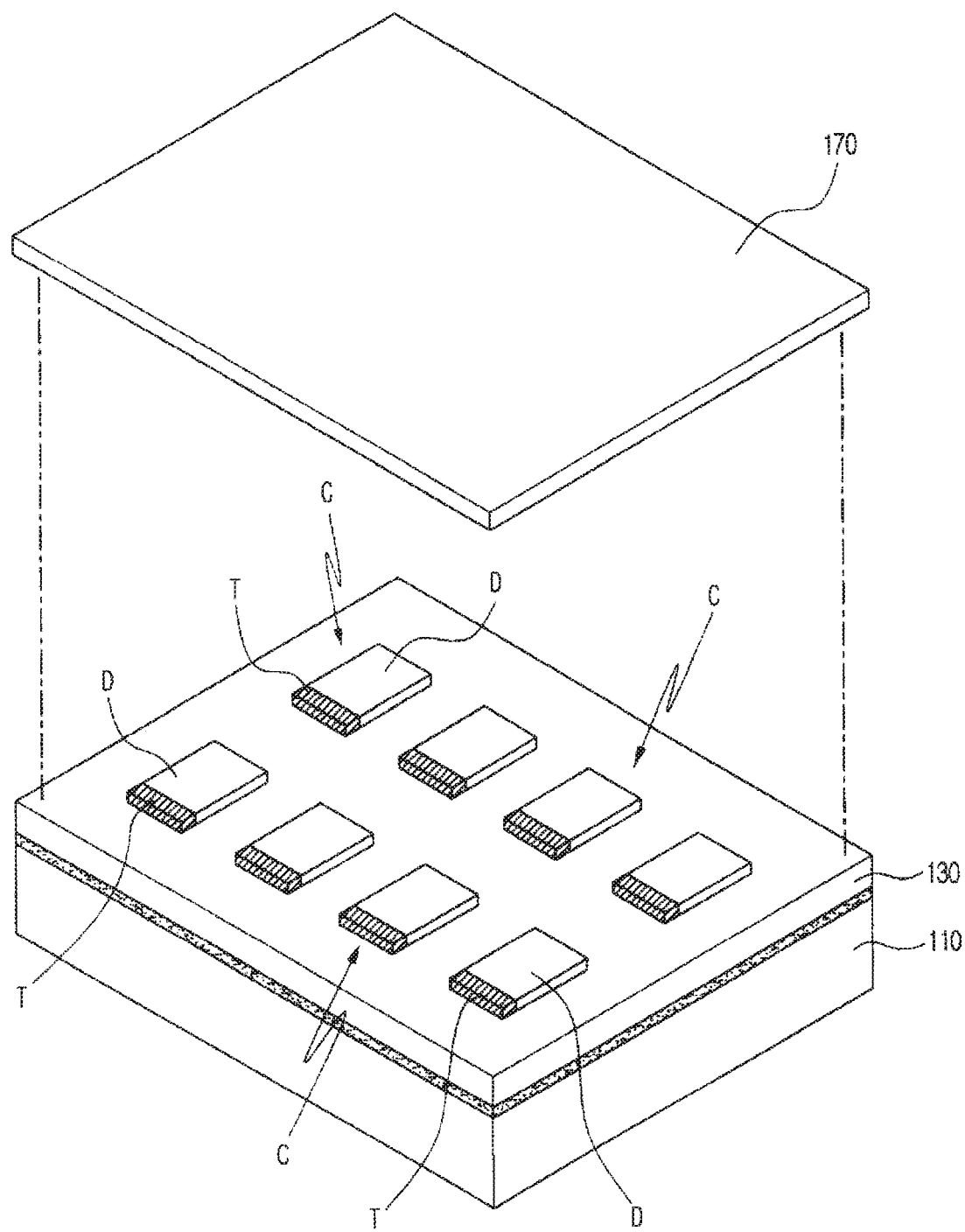
FIG. 4 is a schematic diagram illustrating a step of covering a base layer with the process film in the method of manufacturing the flexible display substrate using the process film of FIG. 2.
Figure 5:
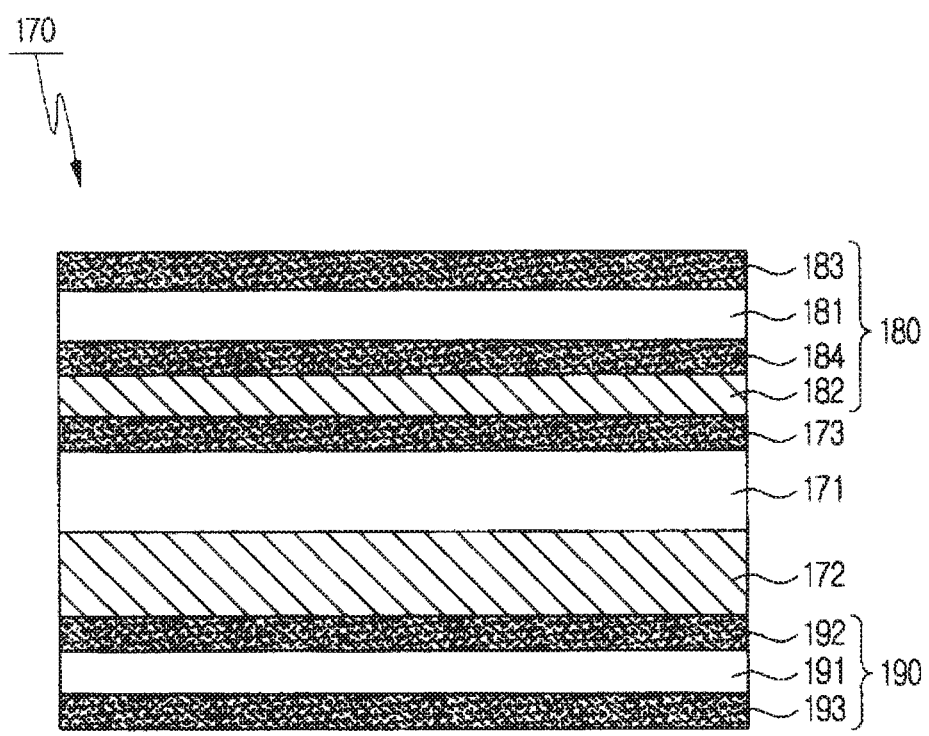
FIG. 5 is a cross sectional diagram illustrating the process film used in the method of manufacturing the flexible display substrate of FIG. 2.
Figure 6:
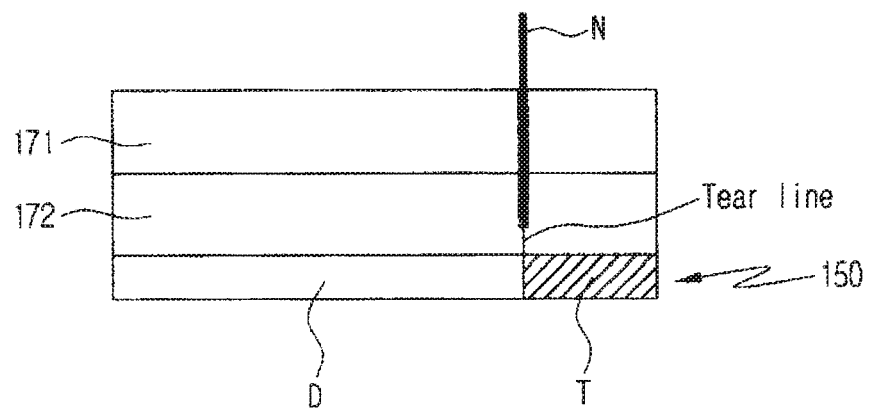
FIGS. 6 and 7 are schematic diagrams illustrating a step of opening a terminal portion in the method of manufacturing the flexible display substrate using the process film of FIG. 2.

FIG. 2 is a block diagram illustrating a method of manufacturing a flexible display substrate using a process film according to an example embodiment; FIG. 3 is a block diagram illustrating a step of opening a terminal portion of the flexible display substrate in the method of manufacturing the flexible display substrate using the process film of FIG. 2; FIG. 4 is a schematic diagram illustrating a step of covering a base layer with the process film in the method of manufacturing the flexible display substrate using the process film of FIG. 2; FIG. 5 is a cross sectional diagram illustrating the process film used in the method of manufacturing the flexible display substrate of FIG. 2; and FIGS. 6 and 7 are schematic diagrams illustrating a step of opening a terminal portion of the flexible display substrate in the method of manufacturing the flexible display substrate using the process film of FIG. 2.

Referring to FIGS. 2 to 7, a method of manufacturing a flexible display substrate using a process film (hereinafter, also referred to as "a method of manufacturing a substrate") according to an example embodiment of the present invention may include a step of preparing a base layer on a glass substrate (S100), a step of performing a packaging process on the base layer to form a plurality of cells (S200), a step of covering the base layer with a process film (S300), a step of separating the base layer from the glass substrate (S400), a step of forming a back film on a rear surface of the base layer (S500), a step of cutting the base layer along each cell to form a plurality of flexible display substrates (S600), and a step of opening a terminal portion of the flexible display substrate (S700).

Hereinafter, a cell (C) refers to a unit disposed on a base layer 130 after the packaging process and before the cutting process, and a flexible display substrate 150 refers to a cell (C) after the cutting process.

The step of preparing the base layer on the glass substrate (S100) may include coating a liquid plastic layer on a glass substrate 110 consisting of glass, or coating an adhesive on the glass substrate 110 and bonding a premade plastic film to the glass substrate 110, thereby laminating the plastic film (hereinafter, referred to as "the base layer 130") on the glass substrate 110.

In an example embodiment, the base layer 130 may include polyimide (PI). In other example embodiments, the liquid plastic or the plastic film may include a thermoplastic resin such as a polycarbonate (PC), polyethersulfone (PES), polyarylate (PAR), poly(ethylene naphthalate) (PEN), poly(ethylene terephthalate) (PET), cycloolefin copolymer, and the like, or a thermosetting resin such as an acryl resin, an epoxy resin, an unsaturated polyester resin, or the like.

The step of performing the packaging process on the base layer to form the plurality of cells (S200) may include forming a plurality of cells (C) on the base layer. The plurality of cells (C) will become the flexible display substrates 150.

That is, in the step (S200), a cleaning process, a thin film deposition process, a photoresist process, an etching process, and the like may be performed in a region where the plurality of cells (C) may be disposed, spaced apart from one another at a predetermined distance, so that various signal lines and an array of thin film transistors may be formed on the base layer 130 to form a display portion (D) and a terminal portion (T). These cells (C) may be cut to provide a single flexible display substrate 150 with the base layer 130.

In some example embodiments, a plurality of packaging processes may be performed on the base layer 130 at once, so that the plurality of flexible display substrates 150 may be manufactured simultaneously. However, the packaging process may also be performed about single cell (C). Embodiments of the present invention are not limited to a number of the cells (C).

The step of covering the base layer with the process film (S300) may include covering the packaged cells (C) with a process film 170, and the process film 170 may have a size substantially the same as that of the base layer 130. The size of the process film 170 may be adjusted, and embodiments of the present invention are not limited to the size of the process film 170.

The process film 170 may be laminated on the base layer 130 such that the process film 170 may provide a predetermined strength and a predetermined flatness to the base layer 130 in the method of manufacturing the flexible display substrate 150.

As illustrated in FIG. 5, the process film 170 according to an example embodiment may include a first base film 171, a first adhesion layer 172 under the first base film 171, a first anti-static coating layer 173 on the first base film 171, a protection film 180 on the first anti-static coating layer 173 and an adhesive protection film 190 under the first adhesion layer 172.

The first base film 171 may support the first adhesion layer 172 and the first anti-static coating layer 173, and may provide a predetermined strength and a predetermined flatness to the base layer 130 during the manufacturing process of the flexible display substrate 150, thereby preventing damage to the flexible base layer 130. The first adhesion layer 172 may have a predetermined bonding strength and may bond the first base film 171 on the base layer 130.

In an example embodiment, the first base film 171 may include poly(ethylene terephthalate) (PET) or poly(ethylene naphthalate) (PEN), and the first adhesion layer 172 may include an organopolysiloxane mixture, the forming of which includes mixing 0.2 to 10 parts by weight of a Pt-catalyst, 0.1 to 1.0 parts by weight of a crosslinker and 0.1 to 1.0 parts by weight of an anchorage additive, with respect to 100 parts by weight of the organopolysiloxane mixture.

In this case, the organopolysiloxane mixture may serve as a base material for providing a bonding strength to the first adhesion layer 172. The Pt-catalyst may be added to promote vulcanization of the organopolysiloxane mixture, thereby converting the organopolysiloxane mixture having a relatively small molecular weight into an organopolysiloxane mixture having a relatively large molecular weight.

Further, the crosslinker may be added to prevent or reduce an occurrence of a fine dust during the process of cutting the process film 170 or the process of opening the terminal portion of the flexible display substrate. The anchorage additive may be added to improve the bonding strength of the process film 170 about the base layer 130. In an example embodiment, the crosslinker may include a siloxane selected from a hydrogenated silicon group, and the anchorage additive may include an organic silane.

The first base film 171 may have a thickness of about 25 μm to about 210 μm, and the first adhesion layer 172 may have a thickness of about 20 μm to about 150 μm.

The thicknesses of the first base film 171 and the first adhesion layer 172 may be adjusted such that a laser or a cutting edge may cut only the first base film 171 and the first adhesion layer 172 under the first base film 171 without touching the base layer 130 during the cutting process, which will be described in more detail later.

The first anti-static coating layer 173 may prevent or reduce static electricity during the laminating of the process film 170 on the base layer 130 and/or during the separating of the process film 170 from the base layer 130. That is, when the process film 170 is laminated on the base layer 130 or the process film 170 is separated from the base layer 130, static electricity, if not prevented or reduced, may damage the manufactured flexible display substrate 150, thereby degrading the reliability of the flexible display substrate 150. In an example embodiment, the first anti-static coating layer 173 may be provided to prevent or reduce the static electricity.

In an example embodiment, the first anti-static coating layer 173 may be prepared by adding a binder into a conductive material such as indium tin oxide (ITO), a carbon nanotube (CNT), polyaniline, polythiopene, or the like.

In other example embodiments, the crosslinker, the anchorage additive and/or the first anti-static coating layer 173 may be omitted. In particular, the first anti-static coating layer 173 may be omitted, if the processes for manufacturing the flexible display substrate 150 are performed in a system for removing static electricity, and this is also applicable to other anti-static coating layers described herein.

The protection film 180 may be provided to protect the first base film 171 and to provide a predetermined strength and a predetermined flatness to the first base film 171 during the manufacturing process of the flexible display substrate 150.

As illustrated in FIG. 5, the protection film 180 may include a second base film 181, a second anti-static coating layer 183 on the second base film 181, a third anti-static coating layer 184 under the second base film 181 and a second adhesion layer 182 under the third anti-static coating layer 184.

Each of the second anti-static coating layer 183 and the third anti-static coating layer 184 may include a material and may have a function such as those described with reference to the first anti-static coating layer 173, therefore, a detailed description thereof will be omitted here.

The second base film 181 may support the second anti-static coating layer 183 and the third anti-static coating layer 184, and may provide a predetermined strength and a predetermined flatness to the base layer 130. The second adhesion layer 182 may have a predetermined bonding strength, and may bond the protection film 180 on the first base film 171.

In particular, for inspecting the flexible display substrate 150 laminated with the first base film 171, if the first base film 171 is scratched, the flexible display substrate 150 having no defect may be determined to be a bad product. To prevent or reduce this case, the first base film 171 may be protected by the protection film 180 during the manufacturing process of the flexible display substrate 150.

The second base film 181 and the second adhesion layer 182 may include a material such as those already described above with reference to the first base film 171 and the first adhesion layer 172, therefore a detailed description thereof will be omitted here.

However, the bonding strength of the second adhesion layer 182 may be smaller than that of the first adhesion layer 172, so that the first base film 171 is not separated from the base layer 130, when the protection film 180 is separated from the first base film 171.

That is, in an example embodiment, the first adhesion layer 172 and the second adhesion layer 182 may include a polymer having a relatively small bonding strength, however the contents included in the second adhesion layer 182 (e.g., the anchorage additive, the crosslinker, and/or the Pt-catalyst) may be adjusted such that the bonding strength of the second adhesion layer 182 may be smaller than that of the first adhesion layer 172.

In the protection film 180 according to example embodiments, the second anti-static coating layer 183 and the third anti-static coating layer 184 may be omitted. Further, according to example embodiments the protection film 180 also may be omitted.

The adhesive protection film 190 may prevent or reduce a contamination of the first adhesion layer 172, until the first base film 171 is laminated on the base layer 130.

As illustrated in FIG. 5, the adhesive protection film 190 may include a third base film 191, a fourth anti-static coating layer 192 on the third base film 191, and a fifth anti-static coating layer 193 under the third base film 191.

The third base film 191 may include a PET, a PEN or an olefin film, and may support the fourth anti-static coating layer 192 and the fifth anti-static coating layer 193. The fourth anti-static coating layer 192 and the fifth anti-static coating layer 193 may prevent or reduce static electricity during laminating and separating the adhesive protection film 190.

Each of the fourth anti-static coating layer 192 and the fifth anti-static coating layer 193 may include a material such as those already described above with reference to the first anti-static coating layer 173, therefore a detailed description thereof will be omitted here. Further, the fourth anti-static coating layer 192 and the fifth anti-static coating layer 193 may be omitted, and the adhesive protection film 190 may also be omitted.

The process film 170 may improve the convenience of a manufacturing process and the reliability of the manufactured flexible display substrate in the method of manufacturing the flexible display substrate 150.

The step of separating the base layer from the glass substrate (S400) may include separating the base layer 130 having the process film 170 from the glass substrate 110.

In the step (S400), the base layer 130 may have a predetermined strength and a predetermined flatness, because the process film 170 is laminated to the base layer 130. Therefore, in example embodiments, the process efficiency and the reliability may be improved.

The step of forming the back film on the rear surface of the base layer (S500) may include bonding a PET film or a PEN film on the rear surface of the base layer 130 such that the rear surface of the base layer 130 may not be contaminated. The step of forming the back film on the rear surface of the base layer (S500) may be omitted.

The step of cutting the base layer along each cell to form a plurality of flexible display substrates (S600) may include cutting the base layer 130 along a formation region of the cell (C) with a laser or a cutting edge to form each of the flexible display substrates 150.

The step of opening the terminal portion of the flexible display substrate (S700) may include cutting the process film 170 corresponding to the terminal portion (T) and tearing off a portion of the process film 170, such that a flexible printed circuit may be bonded to the terminal portion (T) of the manufactured flexible display substrate 150.

As illustrated in FIG. 3, the step (S700) may be divided into a step of cutting the process film to a lower portion of the process film adjacent to a top surface of the flexible display substrate (S710) and a step of tearing off a portion of the process film from the flexible display substrate using an adhesion tape (S730).

Figure 7:
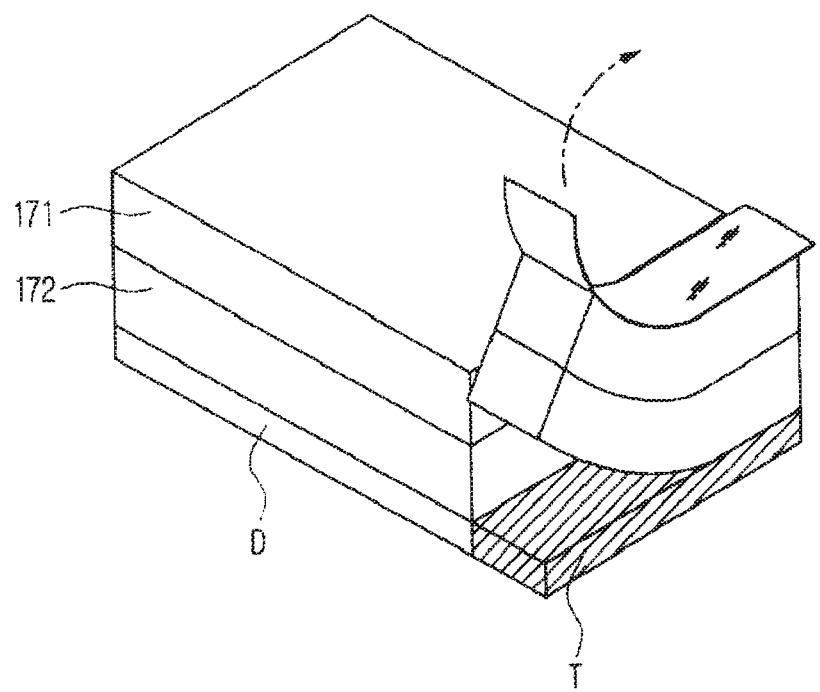

In one example embodiment, the process film 170 only includes the first base film 171 and the first adhesion layer 172, as shown in FIGS. 6 and 7.

The step of cutting the process film to the lower portion of the process film adjacent to the top surface of the flexible display substrate (S710) may include cutting the terminal portion (T) of the manufactured flexible display substrate 150 with a laser or a cutting edge (N, See FIG. 6) such that a flexible printed circuit may be bonded to the flexible display substrate 150.

As illustrated in FIG. 6, in the step (S710), the laser or the cutting edge (N) may entirely cut the first base film 171, and may partially cut the first adhesion layer 172, such that the laser or the cutting edge (N) may not damage a circuit formed in the terminal portion (T).

If the first base film 171 and the first adhesion layer 172 are too thin, there is a possibility that the laser or the cutting edge (N) damages the circuit formed in the terminal portion (T). To reduce this risk, the first base film 171 may be formed to have a thickness of about 25 μm to about 210 μm, and the first adhesion layer 172 may be formed to have a thickness of about 20 μm to about 150 μm.

In an example embodiment, a lower portion of the process film 170 (a tear line, See FIG. 6), which is not cut with the laser or the cutting edge (N), may be torn off in the following step (S730), so that the terminal portion (T) of the flexible display substrate 150 may be completely opened.

The step of tearing off the lower portion of the process film from the flexible display substrate using the adhesion tape (S730) may include bonding the adhesion tape to the portion of the process film 170 covering the terminal portion (T), and tearing off the portion of the process film 170 by pulling away the adhesion tape.

The process film 170 may have a relatively small thickness, and a portion of the process film 170 covering the terminal portion (T) may be cut adjacent to the top surface of the flexible display substrate 150, so that the terminal portion (T) of the flexible display substrate 150 may be easily opened by pulling away the adhesion tape.

Then, the flexible printed circuit may be bonded to the opened terminal portion (T), and the flexible display substrate 150 may be completed.

In the method of manufacturing the flexible display substrate 150 according to example embodiments, the process film 170 may protect the base layer 130, and also may provide a predetermined strength and a predetermined flatness to the base layer 130, so that convenience of a manufacturing process such as separating the base layer 130 from the glass substrate 110 may be improved.

The foregoing is illustrative of example embodiments and is not to be construed as being limited thereto. Although a few example embodiments have been described, those skilled in the art will readily appreciate that many modifications and equivalent arrangements are possible in the example embodiments without departing from the spirit and scope of the present invention. Accordingly, all such modifications are intended to be included within the scope of the present invention.

Therefore, it is to be understood that the foregoing is illustrative of various example embodiments and is not to be construed as being limited to the specific example embodiments disclosed, and instead, the present invention is intended to cover various modifications and equivalent arrangements to the disclosed example embodiments, as well as other example embodiments, are intended to be included within the spirit and scope of the appended claims and equivalents thereof.

What is claimed is:

1. A method of manufacturing a flexible display substrate, comprising:
    preparing a base layer for the flexible display substrate by applying a base layer material to a glass substrate;
    performing a packaging process on the base layer comprising forming a plurality of cells spaced apart from one another, the plurality of cells arranged on the base layer and in a separate layer from the base layer;
    laminating a process film to the plurality of cells on the base layer, the process film comprising a first base film and a first adhesive layer, the first adhesive layer between the plurality of cells and the first base film of the process film, and the plurality of cells between the first adhesive layer and the base layer;
    separating the plurality of cells, the base layer and the process film from the glass substrate; and
    cutting the base layer and the process film to form a plurality of flexible display substrates,
    wherein the preparing of the base layer, the forming of the plurality of cells, and the laminating of the process film are performed in stated order.

2. The method of claim 1, further comprising:
    forming a back film on a rear surface of the base layer to protect the base layer, after the separating of the base layer from the glass substrate.

3. The method of claim 1, wherein the first adhesive layer of the process film comprises an organopolysiloxane mixture.

4. The method of claim 1, wherein the plurality of cells comprise signal lines and an array of thin film transistors.

5. The method of claim 1, wherein the process film comprises:
    the first base film configured to provide a predetermined strength and a predetermined flatness to the base layer; and
    the first adhesive layer under the first base film configured to adhere the first base film to the plurality of cells on the base layer.

6. The method of claim 5, wherein the first base film has a thickness of 25 μm to 210 μm, and the first adhesive layer has a thickness of 20 μm to 150 μm.

7. A method of manufacturing a flexible display substrate, comprising:
    preparing a base layer for the flexible display substrate by applying a base layer material to a glass substrate;
    performing a packaging process on the base layer comprising forming a plurality of cells spaced apart from one another, the plurality of cells arranged on the base layer and in a separate layer from the base layer;
    laminating a process film to the plurality of cells on the base layer, the process film comprising a first base film and a first adhesive layer, the first adhesive layer between the plurality of cells and the first base film of the process film, and the plurality of cells between the first adhesive layer and the base layer;
    separating the plurality of cells, the base layer and the process film from the glass substrate; and
    cutting the base layer and the process film to form a plurality of flexible display substrates,
    wherein the preparing of the base layer, the forming of the plurality of cells, and the laminating of the process film are performed in stated order,
    wherein the process film further comprises:
        a first anti-static coating layer on the first base film configured to prevent static electricity.

8. The method of claim 5, wherein the process film further comprises:
    a protection film laminated to the first base film, the protection film configured to protect the first base film and to provide a predetermined strength and a predetermined flatness to the first base film.

9. The method of claim 8, wherein the protection film comprises:
    a second base film; and
    a second adhesive layer under the second base film configured to adhere the second adhesive layer to the second base film.

10. The method of claim 9, wherein a bonding strength of the second adhesive layer is smaller than a bonding strength of the first adhesive layer.

11. The method of claim 9, wherein the protection film further comprises:
   a second anti-static coating layer on the second base film configured to prevent static electricity; and
   a third anti-static coating layer under the second base film configured to prevent static electricity.

12. The method of claim 5, wherein the process film further comprises:
   an adhesive protection film under the first adhesive layer, and
   wherein the adhesive protection film is configured to prevent a contamination of the first adhesive layer, before adhering the first base film to the plurality of cells on the base layer.

13. The method of claim 12, wherein the adhesive protection film comprises:
   a third base film;
   a fourth anti-static coating layer on the third base film configured to prevent static electricity; and
   a fifth anti-static coating layer under the third base film configured to prevent static electricity.

14. A method of manufacturing a flexible display substrate, comprising:
   preparing a base layer for the flexible display substrate by applying a base layer material to a glass substrate;
   performing a packaging process on the base layer comprising forming a cell, the cell arranged on the base layer and in a separate layer from the base layer;
   laminating a process film to the cell on the base layer, the process film comprising a first base film and a first adhesive layer, the first adhesive layer between the cell and the first base film of the process film, and the cell between the first adhesive layer and the base layer;
   separating the cell, the base layer and the process film from the glass substrate; and
   cutting the base layer and the process film to form the flexible display substrate,
   wherein the preparing of the base layer, the forming of the cell, and the laminating of the process film are performed in stated order.

15. The method of claim 14, further comprising:
   forming a back film on a rear surface of the base layer to protect the base layer, after the separating of the base layer from the glass substrate.

16. The method of claim 14, wherein the first adhesive layer of the process film comprises an organopolysiloxane mixture.

17. The method of claim 14, wherein the cell comprises signal lines and an array of thin film transistors.

18. The method of claim 14, wherein the process film comprises:
   the first base film configured to provide a predetermined strength and a predetermined flatness to the base layer; and
   the first adhesive layer under the first base film configured to adhere the first base film to the cell on the base layer.

19. The method of claim 18, wherein the first base film has a thickness of 25 µm to 210 µm, and the first adhesive layer has a thickness of 20 µm to 150 µm.

* * * * *